(12) United States Patent
Haddad (10) Patent No.: US 8,509,185 B2
(45) Date of Patent: Aug. 13, 2013

(54) ENABLING IPV6 MOBILITY WITH NAT64

(75) Inventor: Wassim Haddad, San Jose, CA (US)

(73) Assignee: Telefonaktiebolaget LM Ericsson, Stockholm (SE)

( * ) Notice: Subject to any disclaimer, the term of this patent is extended or adjusted under 35 U.S.C. 154(b) by 424 days.

(21) Appl. No.: 12/819,074

(22) Filed: Jun. 18, 2010

(65) Prior Publication Data

US 2011/0211553 A1   Sep. 1, 2011

Related U.S. Application Data

(60) Provisional application No. 61/308,660, filed on Feb. 26, 2010.

(51) Int. Cl.
*H04J 3/22* (2006.01)

(52) U.S. Cl.
USPC ............................................ 370/331; 370/466

(58) Field of Classification Search
None
See application file for complete search history.

(56) References Cited

U.S. PATENT DOCUMENTS

| | | | |
|---|---|---|---|
| 7,245,622 B2 | 7/2007 | Huitema | |
| 7,315,543 B2 | 1/2008 | Takeuchi et al. | |
| 7,526,562 B1 | 4/2009 | Samprathi et al. | |
| 7,573,903 B2 | 8/2009 | Miyata et al. | |
| 7,764,686 B1 | 7/2010 | Toebes et al. | |
| 7,924,832 B2 | 4/2011 | Li et al. | |
| 8,046,452 B2 | 10/2011 | Hovell et al. | |
| 2004/0153502 A1 | 8/2004 | Jiang | |
| 2004/0165602 A1 | 8/2004 | Park et al. | |
| 2004/0190549 A1 | 9/2004 | Huitema | |
| 2005/0083969 A1* | 4/2005 | Lee et al. | 370/466 |
| 2006/0015647 A1 | 1/2006 | Kang et al. | |
| 2006/0062248 A1 | 3/2006 | Huang et al. | |
| 2006/0259641 A1 | 11/2006 | Kim et al. | |
| 2006/0259969 A1 | 11/2006 | Suh et al. | |
| 2007/0088853 A1 | 4/2007 | Lee et al. | |
| 2008/0114898 A1 | 5/2008 | Takeda et al. | |
| 2008/0273509 A1* | 11/2008 | Li | 370/338 |
| 2010/0220738 A1* | 9/2010 | Sarikaya | 370/401 |
| 2011/0038377 A1* | 2/2011 | Haddad | 370/395.53 |
| 2011/0208877 A1* | 8/2011 | Ikeda et al. | 709/238 |
| 2011/0211558 A1* | 9/2011 | Ikeda et al. | 370/331 |
| 2011/0292850 A1 | 12/2011 | Oishi et al. | |
| 2012/0066695 A1* | 3/2012 | Berezansky et al. | 719/328 |
| 2012/0259998 A1* | 10/2012 | Kaufman | 709/245 |

OTHER PUBLICATIONS

Bangulo et al., "Stateful NAT64: Network Address and Protocol Translation from IPv6 Clients to IPv4 Servers draft-ietf-behave-v6v4-xlate-stateful-08", IETF, Jan. 2010, whole document.*

(Continued)

*Primary Examiner* — Suk Jin Kang
(74) *Attorney, Agent, or Firm* — Blakely, Sokoloff, Taylor & Zafman (57) ABSTRACT

A method for maintaining connectivity between a mobile node and a corresponding node when the mobile node connects to a foreign network, where the foreign network and the home network are Internet protocol version 6 (IPv6) networks but the corresponding node is an Internet protocol version 4 (IPv4) node. The method includes receiving at the home agent node an IPv6 care-of address, determining that the IPv6 care-of address belongs to the foreign network and that the foreign NAT64 node has a prefix to to generate virtual IPv6 addresses and sending a prefix binding request message to a home NAT64 node to bind the prefix to the home address of the mobile node for translation between IPv6 and IPv4.

11 Claims, 6 Drawing Sheets

(56) References Cited

OTHER PUBLICATIONS

H. Soliman, "Mobile IPv6 Support for Dual Stack Hosts and Routers", RFC 5555, Jun. 2009, whole document.*

Bagnulo, *NAT64: Network Address and Protocol Translation from IPv6 Clients to IPv4 Servers*; draft-bagnulo-behave-nat64-03.bd, No. 3, Mar. 7, 2009, 28 pages.

Bagnulo, *DNS64: DNS extensions for Network Address Translation from IPv6 Clients to IPv4 Servers draft-ietf-behave-dns64-00*, Jul. 4, 2009, 26 pages.

Durand, A. , "Dual-stack lite broadband deployments post IPv4 exhaustion draft-ietf-software-dual-lite-03", *Internet Engineering Task Force; Internet Draft*; Feb. 3, 2010; 37 pages.

Johnson, D. , et al., "Mobility Support in IPv6 draft-ietf-mext-rfc3775bis-04.text", *IETF Mobile IP Working Group*; Jul. 13, 2009; 176 pages.

*Non-Final Office Action*, U.S. Appl. No. 12/815,257, dated Jan. 27, 2012, 18 pages.

*Final Office Action*, U.S. Appl. No. 12/815,257, dated Aug. 14, 2012, 15 pages.

*Non-Final Office Action*, U.S. Appl. No. 12/850,488, dated Aug. 29, 2012, 14 pages.

*Non Final Office Action*, U.S. Appl. No. 12/850,488, dated Aug. 29, 2012, 10 pages.

*Non-Final Office Action*, U.S. Appl. No. 12/815,257, dated Jan. 31, 2013, 19 pages.

*Notice of Allowance*, U.S. Appl. No. 12/850,488, dated Feb. 25, 2013, 9 pages.

* cited by examiner

ENABLING IPV6 MOBILITY WITH NAT64

CROSS-REFERENCE TO RELATED APPLICATION

This application claims the benefit of the earlier filing date of co-pending U.S. Provisional Patent Application No. 61/308,660, filed Feb. 26, 2010.

FIELD OF THE INVENTION

The embodiments of the invention relate to the ability of mobile devices to move between networks. Specifically, the embodiments of the invention relate to a method and system for enabling IPv6 native mobile devices to migrate to a foreign IPv6 network and maintain connectivity within an IPv4 corresponding node.

BACKGROUND

The mobile Internet protocol version 6 (MIPv6) allows a mobile device to maintain a continuous connection with another device that supports Internet protocol version 6. Two separate modes of communication are supported: bidirectional tunneling (BT) mode and route optimization (RO) mode. RO mode dynamically updates the routing of traffic between a mobile device or "mobile node" (MN) and a node that is communicating or corresponding with the mobile node, i.e., a corresponding node (CN). BT mode tunnels traffic between the MN and CN through a home agent (HA) device or home agent node on a home network. The HA node is updated with a location of the MN on a new network and relays data traffic to the CN. Both the home and visited networks run IPv6 and are equipped with network address translation (NAT64) and domain name server (DNS64) nodes to enable IPv6 nodes to access the IPv4 nodes outside the IPv6 network by treating outside IPv4 nodes as virtual IPv6-enabled nodes. Under this scheme, nodes in the home or visited networks will see a CN that is an IPv4 node as being an IPv6 node and will send data packets to a virtual IPv6 destination address. However, these packets will be captured by the local NAT64 node and translated into IPv4 packets before being forwarded to the CN IPv4 destination.

Conversely, when communicating with an MN or other IPv6 mode, the CN operates as if it is connected to an IPv4 node. The CN will send data packets to the MN using an IPv4 destination address. These packets are captured by the NAT64 node located in the home network of the MN and translated into IPv6 packets then forwarded to their final destination.

However, in the NAT64/DNS64 technology, each network equipped with DNS64 technology will synthesize locally a different AAAA record (i.e., the DNS record which refers to an IPv6 address) for a particular IPv4 address. Such "fake" or "virtual" IPv6 addresses carry a prefix that is recognizable only by the home NAT64 node as being one, which requires a translation to IPv4. Another NAT64 located in a different network and attached to a different DNS64 is not able to translate the IPv6 address without additional information.

When the MN tries to connect to an IPv4 native CN from a foreign network, the visited DNS64 will synthesize an AAAA record that would carry a virtual IPv6 address known only by the NAT64 node located in the visited network (i.e., a foreign NAT64 node). However, in the MIPv6 protocol, using the BT mode requires tunneling the data packets to the home network (i.e., the home agent (HA) node, which in turn forwards the data traffic to its final destination. In such cases, data packets tunneled by the MN to its HA node can't be forwarded to the home NAT64 node, because the prefix used to generate the IPv6 address for the CN is unknown to both the HA and the home NAT64 nodes. As a result, connectivity is lost. The RO mode is not usable, because it requires that both the MN and CN be IPv6 nodes.

SUMMARY

A method for maintaining connectivity between a mobile node and a corresponding node when the mobile node connects to a foreign network, wherein a home address was associated with the mobile node and a home agent node when the mobile node was within the home network, wherein the foreign network and the home network are Internet protocol version 6 (IPv6) networks but the corresponding node is an Internet protocol version 4 (IPv4) node. The method includes receiving at the home agent node connected to the home network a binding update message from the mobile node currently connected to the foreign network, the binding update message including an IPv6 care-of address of the mobile node assigned by the foreign network, determining by the home agent node that the IPv6 care-of address belongs to the foreign network, that the foreign network has a foreign network address translation 64 (NAT64) node, and that the foreign NAT64 node has an a prefix to append to IPv4 addresses to generate virtual IPv6 addresses for any IPv4 nodes communicating with the mobile node while in the foreign network, wherein a NAT64 translates data traffic between IPv4 and IPv6, and sending a prefix binding request message by the home agent node to a home NAT64 node on the home network to bind the prefix to the home address of the mobile node for translation between IPv6 and IPv4, whereby the home agent provides to the home NAT64 node the binding information, including the foreign NAT64 node's prefix, that enables the home NAT64 node to translate between IPv6 and IPv4 formatted data packets, which are sent between the mobile node and the corresponding node, through concatenation of the prefix to the corresponding node's IPv4 address found in the source address field of those of the data packets traveling toward the mobile node, and through removal of the prefix from the corresponding node's virtual IPv6 address found in the destination address field of those of the data packets traveling toward the corresponding node.

A network element for maintaining connectivity between a mobile node and corresponding nodes when the mobile node is currently connected to a foreign network, wherein the network element is a part of a home network in which a home address was associated with the mobile node when the mobile node was within the home network, wherein the network element functions as a home agent for the mobile node and manages data traffic for the home address when the mobile node is in foreign networks, wherein the foreign networks and the home network are Internet protocol version 6 (IPv6) networks, but the corresponding nodes are Internet protocol version 4 (IPv4) nodes. The network element includes a mobility management module configured to receive data traffic from the mobile node and forward that data traffic to a home network address translation 64 (NAT64) node, wherein the mobility management module is further configured to forward data traffic from the home NAT64 node to the mobile node, wherein a NAT64 translates data traffic between IPv4 and IPv6. The network element also includes a bindings management module coupled to the mobility management module, the bindings management module configured to receive binding update messages from the mobile node when the mobile node connects to foreign networks, each of the binding update messages including an IPv6 care-of address assigned by the foreign network to which the mobile node is currently connecting, wherein the bindings management module is further configured to send a binding request message, responsive to each of the binding update messages, to the home NAT64 node to bind the mobile node's home address with a prefix of a foreign NAT64 node in that foreign network. The network element further includes a prefix management module coupled to the bindings management module, wherein the prefix management module is configured to determine the foreign network which assigned the IPv6 care-of addresses to the mobile node, as well as the prefix used by that foreign network's foreign NAT64 node to generate virtual IPv6 addresses from IPv4 addresses of any IPv4 nodes in communication with that foreign network. The network element provides with each of the binding request messages the binding information, including the foreign NAT64 node's prefix, to the home NAT64 node that enables the home NAT64 node to translate between IPv4 and IPv6 formatted data packets, which are sent between the mobile node and the corresponding nodes, through concatenation of that foreign NAT64 node's prefix to the corresponding nodes' IPv4 addresses found in the source address field of those of the data packets traveling toward the mobile node, and through removal of that foreign NAT64 node's prefix from the corresponding nodes' virtual IPv6 addresses found in the destination address field of those of the data packets traveling toward the corresponding nodes.

A method for maintaining connectivity between a mobile node and a corresponding node when the mobile node is currently connected to a foreign network, wherein a home address was associated with the mobile node and a home agent node when the mobile node was within the home network, wherein the foreign network and the home network are Internet protocol version 6 (IPv6) networks but the corresponding node is an Internet protocol version 4 (IPv4) node. The method includes receiving a prefix binding request message from the home agent node, wherein the prefix binding request message includes the home address of the mobile node and a prefix utilized by a foreign network address translation 64 (NAT64) node within the foreign network to append to IPv4 addresses to generate virtual IPv6 addresses for any IPv4 nodes communicating with the mobile node while on the foreign network, wherein a NAT64 translates data traffic between IPv4 and IPv6, storing the foreign NAT64 node's prefix and the mobile node's home address in an entry of a translation table that is maintained by the network element to perform NAT64 translation within the home network, thereby binding the foreign NAT's prefix and the home address of the mobile node, sending a prefix binding acknowledgement message to the home agent node to confirm that the translation table has been updated to bind the foreign NAT's prefix to the home address of the mobile node, translating a first data packet received from the home agent node, which was sent by the mobile node to the corresponding node, from IPv6 to IPv4 format through detection and removal of the foreign NAT's prefix from the first data packet's destination address field, wherein the first packet's destination address field contained a virtual IPv6 address and the foreign NAT's prefix's removal there from leaves the IPv4 address of the corresponding node, and translating a second data packet, which was received from the corresponding node and was sent by the corresponding node to the mobile, from IPv4 to IPv6 format through appending the foreign NAT's prefix to the second data packet's source address responsive to the second data packet's destination address field containing the mobile node's home address, wherein the second packet's source address field contained the corresponding node's IPv4 address and the foreign NAT's prefix's concatenation thereto yields the corresponding node's virtual IPv6 address. The mobile node can maintain connectivity with the corresponding node transparent to the corresponding node and the foreign NAT64 node.

A network element for maintaining connectivity between a mobile node and corresponding nodes when the mobile node is currently connected to a foreign network, wherein the network element is a part of a home network in which a home address was associated with the mobile node when the mobile node was within the home network, wherein the network element performs network address translation 64 (NAT64) for the home network, wherein a NAT64 translates data traffic between IPv4 and IPv6, wherein the foreign networks and the home network are Internet protocol version 6 (IPv6) networks, but the corresponding nodes are Internet protocol version 4 (IPv4) nodes. The network element includes a bindings management module configured to process binding request messages received from a home agent node and reply with binding acknowledgement messages sent to the home agent node, wherein each of the binding request messages includes both the mobile node's home address and a prefix used by a foreign NAT64 node in the foreign network to which to the mobile node is currently connected, wherein the bindings management module is further configured to maintain a translation table that has an entry that stores a binding of the mobile node's home address and the foreign NAT64 node's prefix of the most recent of the binding request messages. The network element includes a translation module coupled to the bindings management module, the translation module configured to translate outbound data packets sent by the mobile node to corresponding nodes from IPv6 to IPv4 format, the translation including detection and removal of the foreign NAT64 node's prefix from outbound data packets' destination address field, wherein the outbound data packets' destination address field contain virtual IPv6 addresses and the foreign NAT64 node's prefix's removal there from leaves the IPv4 address of the corresponding nodes, and wherein the translation module is further configured to use the current binding to translate inbound data packets received from the corresponding nodes from IPv4 to IPv6 format through appending the foreign NAT64 node's prefix to the inbound data packets' source address responsive to detecting that the inbound data packets' destination address is the mobile node's home address, wherein the inbound data packets' source address field contains the corresponding nodes' IPv4 addresses and the foreign NAT64 nodes' prefix's concatenation thereto yields the corresponding nodes' virtual IPv6 addresses. The mobile node can maintain connectivity with corresponding nodes transparent to the corresponding nodes and the foreign NAT64 node.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiments of FIGS. 1, 2A and 2B. However, it should be understood that the operations of the flow diagrams can be performed by embodiments of the invention other than those discussed with reference to FIGS. 1, 2A and 2B, and the embodiments discussed with reference to FIGS. 1, 2A and 2B can perform operations different than those discussed with reference to the flow diagrams of FIGS. 3-5.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and a display), and network connections. The coupling of the set of processors and other components is typically through one or more busses and bridges (also termed as bus controllers). The storage device and signals carrying the network traffic respectively represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly) to edge network elements, which are coupled (e.g., through one or more core network elements to other edge network elements) to other end stations (e.g., server end stations).

The embodiments of the present invention provide a system, network and method for avoiding the disadvantages of the prior art including: the loss of connectivity with Internet protocol version 4 nodes when a mobile node moves to a foreign network.

The embodiments of the invention overcome these disadvantages by modifying the functionality of a home agent (HA) node and home network address translation 64 (NAT64) node to maintain connectivity without any modifications of the mobile node (MN), foreign network, IPv4 network or corresponding node (CN). When an HA node receives a binding update (BU) message from an MN, the HA node stores the care-of address for the MN and initiates a domain name server (DNS) look-up (or similar look-up) to determine whether a NAT64 exists on the foreign network. The look-up returns prefixes utilized by the foreign NAT64 or DNS64 nodes. Upon obtaining the prefixes, a prefix binding request is sent to the home NAT64 node to provide it with the prefixes. The home NAT64 node stores a prefix binding entry in a cache memory or translation table and returns a prefix binding acknowledgement (PBA). The HA node and home NAT64 node can use this data to properly translate and tunnel data between the CN and the MN and maintain connectivity.

Figure 1:
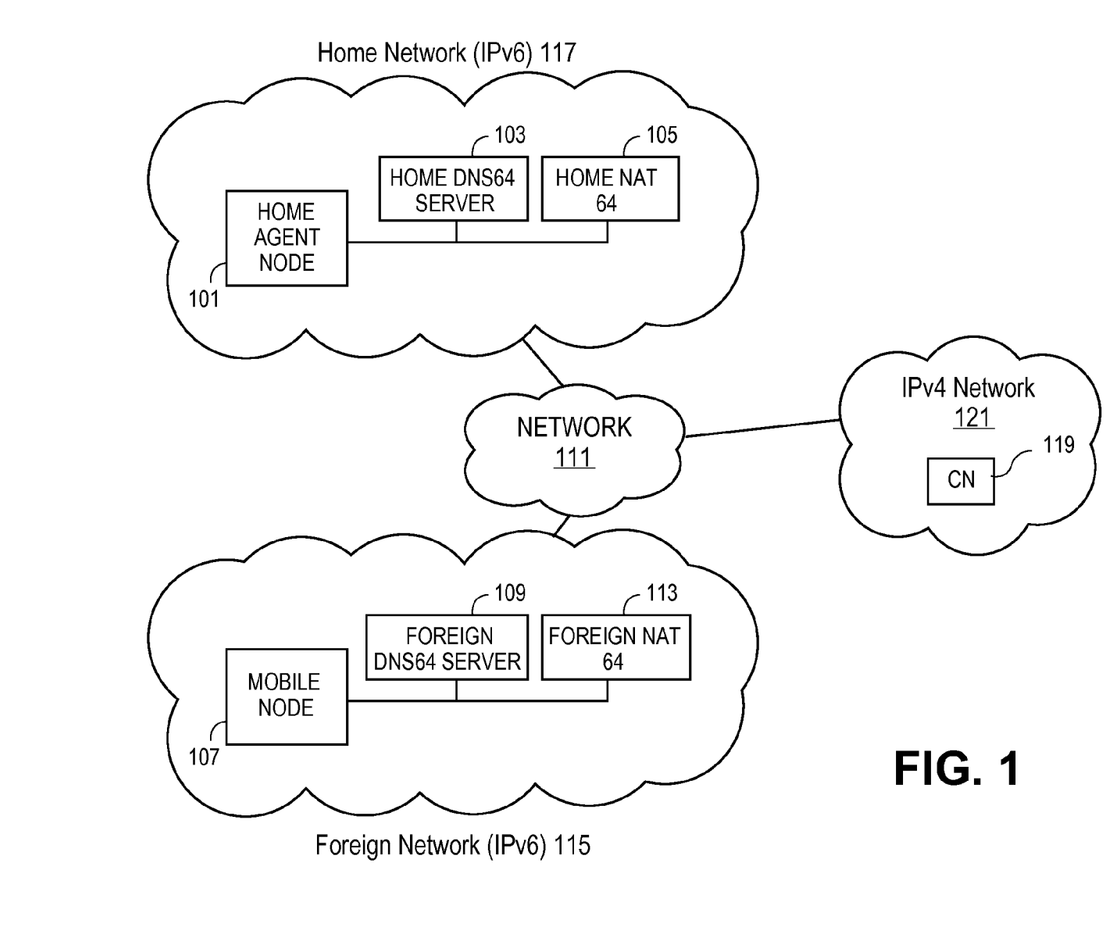
FIG. 1 is a diagram of one embodiment a network environment including a home network, a foreign network and an IPv4 network.

FIG. 1 is a diagram of one embodiment of a network including a home network, foreign network and corresponding node in an IPv4 network. In one embodiment, the home network 117 is an IPv6 network and is a home network for a mobile device 107. The home network 117 can be any type of network including a local area network, a wide area network or similar network. The home network 117 is in communication with a foreign network 115 and an IPv4 network of the corresponding node (CN) 119 through an intermediate network 111. The intermediate network 111 can be any type of network including a local area network, a wide area network, such as the Internet or similar network. In other embodiments, the home network 117 is in direct communication with the foreign network 117.

The home network 117 can include a home agent node 101, a home domain name server 64 (DNS64) 103, a home network address translation 64 (NAT64) node and any number of additional computers or devices. The home agent node 101 can be any type of computing device or networking element including a desktop computer, a laptop computer, server, router, console device or similar device. The home agent node 101 is responsible for facilitating the communication from and to the mobile node 107 regardless of its location.

The home DNS64 103 provides domain name look-up services to each of the computing devices within the home network 117. The home DNS64 103 can also synthesize an AAAA record for nodes that are on IPv4 networks and have IPv4 addresses. In one embodiment, the home NAT64 node 105 can be implemented in the same computing device or network element as the DNS64 107. In one embodiment, the home NAT64 node 105 can be implemented on a separate device from the home DNS64 103. The home DNS64 103 and home NAT64 node 105 can be implemented in any type of computing device including a network element, router, desktop workstation, server, console device or similar computing device. The home network NAT64 node is responsible for translating IPv4 messages and addresses and mapping them to virtual IPv6 addresses when a node on the home network communicates with an external node that is in the IPv4 network.

A corresponding node, as used herein refers to a node such as a computing device including a desktop, workstation, laptop, server, console device or any other type of computing device that is in communication with a node of the home network 107, or more specifically with the mobile node 107. Corresponding node 119 communicates with the mobile node 107 through the home agent node 101. The corresponding node 119 is part of an IPv4 network 121. The corresponding node 119 has an IPv4 address and utilizes IPv4 addresses when communicating with other nodes including the mobile node 107. This necessitates the use of a NAT64 node 105 on the home network 117.

A foreign network is an IPv6 network 115. An example of a foreign network is a network provided by a business establishment such as a restaurant or hotel, which the user of the mobile node is visiting. While visiting the foreign network 115, the mobile node 107 can continuously correspond with the corresponding node 119 without interruption that would be caused by having to re-establish a connection using the new IPv6 address provided by the foreign DNS64 109. The mobile node 107 can utilize the services of the foreign DNS64 as well as the foreign NAT64 node 113. The foreign DNS64 109 synthesizes an AAAA record for the communication between the mobile node 107 and corresponding node 119. The virtual address and prefix utilized are known only to the foreign DNS64 109 and foreign NAT64 node 113. The prefix as used herein refers to the portion of a virtual IPv6 address created for communication with an IPv4 node that identifies the virtual IPv6 address as virtual and requiring translation.

However, since the corresponding node 119 will be sending traffic to the home network 117, for connectivity to be maintained, the bindings established by the foreign network 115, by the foreign DNS64 109 and the foreign NAT64 node 113 as well as the prefix utilized by the foreign NAT64 node 113 when translating IPv4 address of the corresponding node 119 into a virtual IPv6 address must be known by the home agent node 101 and home NAT64 node 105. Configuring the home network components including the home agent node 101, home DNS64 103 and the home NAT64 node 105 to support continued connectivity in this scenario, is transparent to the components within the foreign network 115, the mobile node 107 and the corresponding node 119.

Figure 2A:
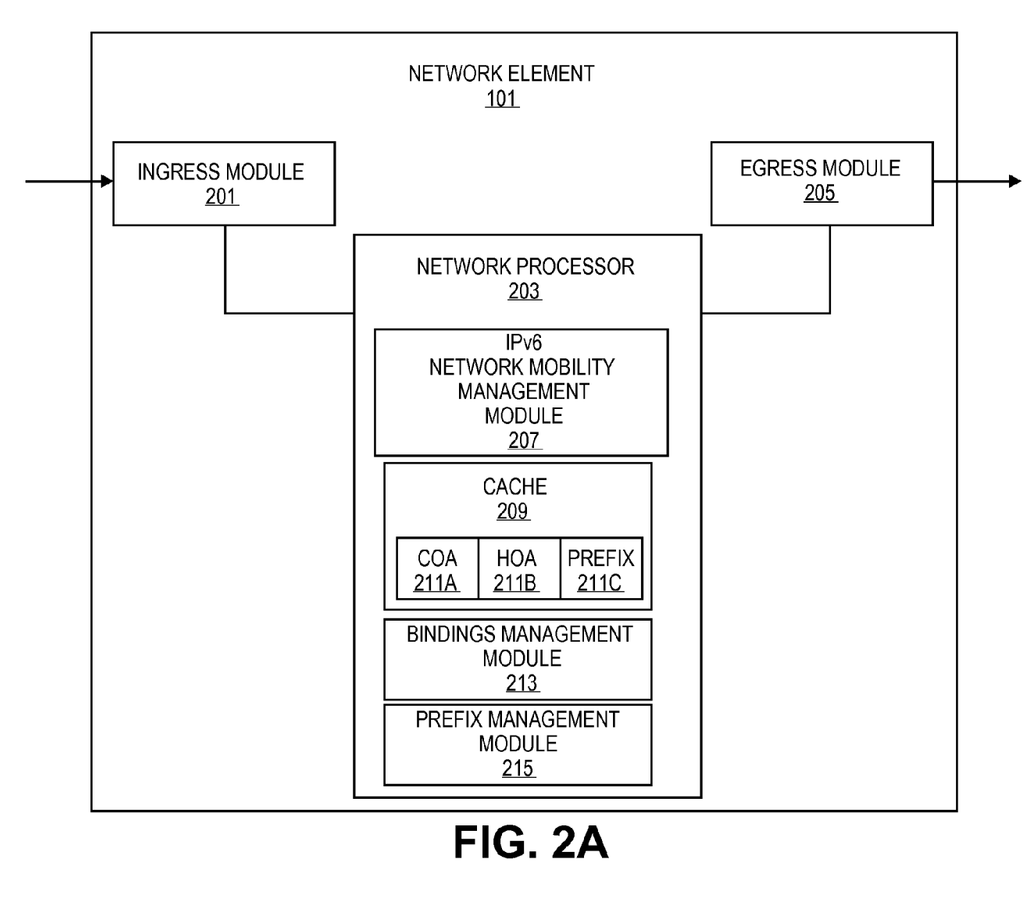
FIG. 2A is a diagram of one embodiment of a network element implementing a home agent node

FIG. 2A is a diagram of one embodiment of a network element serving as the home agent node. The network element 101 can include an ingress module 201, an egress module 205 and a network processor 203. The ingress module 201 can handle the processing of data packets being received by the network element at the physical link and data link level. The egress module 205 handles the processing and data packets being transmitted by the network element at the physical link and data link level. The network processor 203 handles the routing, forwarding and higher level processing of the data traffic. The network processor 203 can execute or include an IPv6 network mobility management module 207, cache 209, bindings management module 213 and a prefix management module 215.

The mobility management module 207 receives data traffic from the mobile node and forwards that data traffic to a home network address translation 64 (NAT64) node. The mobility management module 207 forwards data traffic from the home NAT64 node to the mobile node after the home NAT64 node translates the data traffic from an IPv4 format to an IPv6 format. The mobility management module 207 also forwards data traffic from the mobile node to the home NAT64 node in route to the corresponding node. The home NAT64 node will translate the traffic from an IPv6 format to an IPv4 format before sending it to the corresponding node.

The bindings management module 213 receives binding update messages from the mobile node when the mobile node connects to foreign networks. Each of the binding update messages including an IPv6 care-of address assigned by the foreign network to which the mobile node is currently connecting. The bindings management module 213 is further configured to send a binding request message, responsive to each of the binding update messages that is received, to the home NAT64 node to bind the mobile node's home address with a prefix of a foreign NAT64 node in that foreign network at the home NAT64 node.

A prefix management module 215 determines the foreign network that assigned the IPv6 care-of address to the mobile node, as well as the prefix used by that foreign network's foreign NAT64 node to generate virtual IPv6 addresses. The prefix management module 215 queries a domain name server (DNS) or Secure Inter-Domain Routing (SIDR) node to obtain the prefix corresponding to the foreign NAT64 node. The prefix 211C is stored in a local cache 209 along with the care-of address 211A, home address 211B and other information related to the bindings of the mobile node.

Figure 2B:
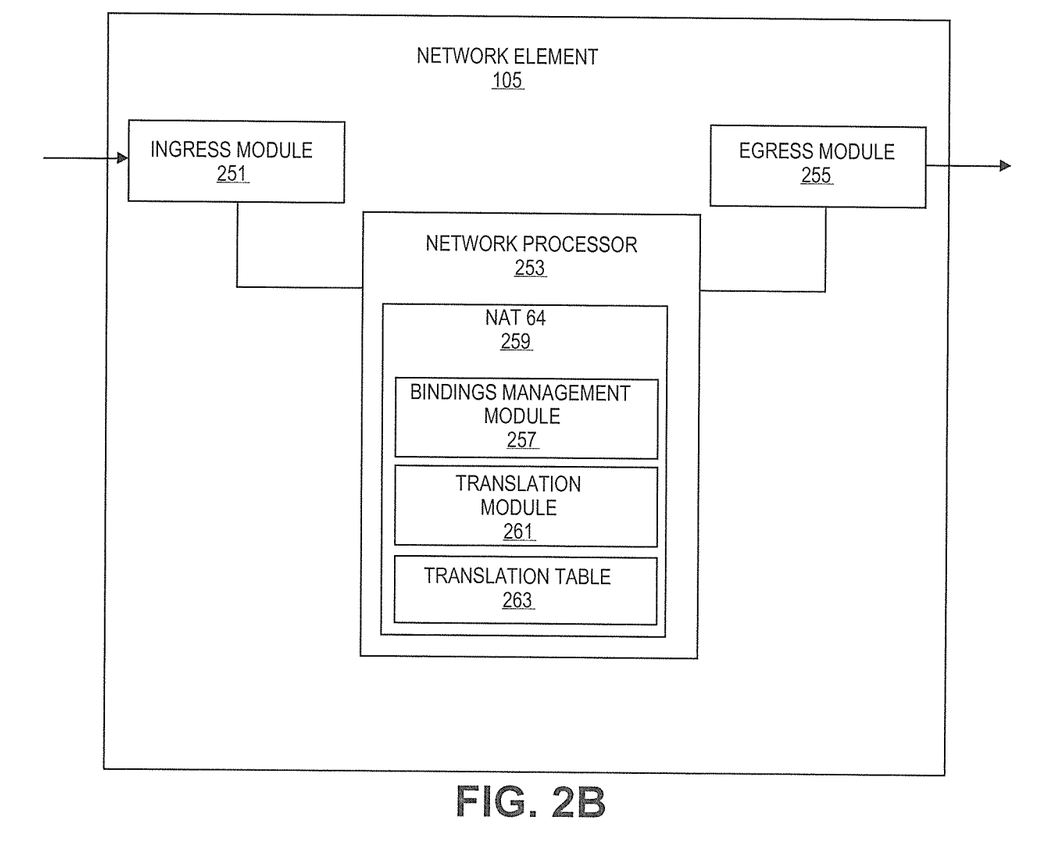
FIG. 2B is a diagram of one embodiment of a network element implementing a home network address translation 64 (NAT64) node.

FIG. 2B is a diagram of one embodiment of a network element serving as the home NAT64 node. The network element 250 can include an ingress module 251, an egress module 255 and a network processor 253. The ingress module 251 can handle the processing of data packets being received by the network element at the physical link and data link level. The egress module 255 handles the processing and data packets being transmitted by the network element at the physical link and data link level. The network processor 253 handles the routing, forwarding and higher level processing of the data traffic. The network processor 253 can execute or include a network address translation 64 (NAT64) module 259. The NAT64 module 259 can handle the translation of data traffic from IPv4 format to IPv6 format including the translation of source and destination addresses and the replacement of virtual IPv6 addresses with corresponding IPv4 addresses. The NAT64 can also handle the translation of data traffic from IPv6 format to IPv4 format. In one embodiment, the NAT64 module 259 includes a bindings management module 257, translation module 261 and translation table 263.

The bindings management module 257 processes binding request messages received from the home agent node and replies to these messages with binding acknowledgement messages. The binding acknowledgement messages are sent to the home agent node. Each of the binding request messages includes both the mobile node's home address and a prefix used by a foreign NAT64 node in the foreign network to which to the mobile node is currently connected. The bindings management module 257 maintains a translation table 263 that stores a mapping or 'binding' of the mobile node's home address and the foreign NAT64 node's prefix of the foreign network that the mobile node is currently connected to. The translation table 263 generally is used to track sessions between IPv6 nodes in the home network and external IPv4 nodes and to translate the data traffic between them using stored virtual IPv6 addresses for the external IPv4 nodes.

The translation module 261 translates outbound data packets sent by the mobile node to corresponding nodes from IPv6 format to IPv4 format. The translation including detection and removal of the foreign NAT64 node's prefix from outbound data packets' destination address field. The outbound data packets' destination address fields contain virtual IPv6 addresses and the foreign NAT64 node's prefix's removal there from leaves the IPv4 address of the corresponding nodes.

The translation module 261 uses the current bindings in the translation table to translate inbound data packets received from the corresponding nodes from IPv4 format to IPv6 format. The translation module appends the foreign NAT64 node's prefix to the inbound data packets' source address responsive to detecting that the inbound data packets' destination address is the mobile node's home address. The inbound data packets' source address field contains the corresponding nodes' IPv4 addresses and the foreign NAT64 nodes' prefix's concatenated thereto to create the corresponding nodes' virtual IPv6 addresses.

Figure 3A:
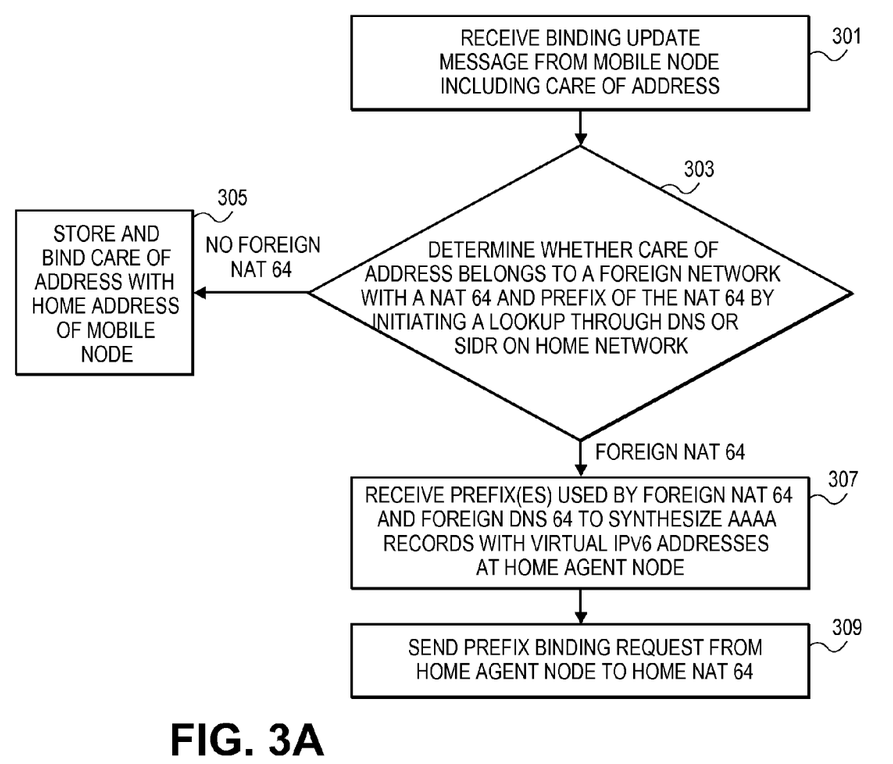
FIG. 3A is a flowchart of one embodiment of a process for configuring the home network to handle the processing of traffic for the mobile node in a foreign network implemented in the home agent node.

FIG. 3A is a flowchart of one embodiment of a process for configuring a network to support the continuous connectivity of a mobile node with a corresponding node on an IPv4 network implemented at the home node. In one embodiment, this process is initiated at the home agent node by receiving a binding update (BU) message from the mobile node including its care-of address (Block 301). The mobile node sends the binding update message upon establishing itself in the foreign network. The care-of address will be assigned by the use of stateless address configuration or a local dynamic host configuration protocol (DHCP) server on the foreign network. The binding update provides the care-of address to the home agent node and the home network in order to enable the home network to forward data traffic received at the home network to the mobile node. Corresponding nodes utilize the home address of the mobile node, which is serviced by the home agent and in turn is forwarded or tunneled by the home agent node to the mobile node.

In response to receiving the binding update message, a determination is made by the home agent whether the care-of address belongs to a foreign network with a NAT64 by initiating a lookup with the DNS server or by use of Secure Inter-Domain Routing (SIDR) on the home network (Block 303). A lookup through the use of DNS or the SIDR can provide or return a set of prefixes used by the DNS that generated the care-of address if the care-of address uses the prefix then a NAT64 is present on the foreign network. This information can either be maintained as part of the overall DNS scheme or SIDR scheme or it can be obtained by querying a repository of such information. If no foreign NAT64 node is present, then the management of the binding update messages proceeds as normal and the care-of addresses is stored and bound to the home address of the mobile node by the home agent node (Block 305).

If however, the foreign NAT64 node is found to be present, then the prefix received from the DNS or SIDR lookup is stored by the home agent node along with the care-of address and related data (Block 307). The home agent node then sends a prefix binding request (PBR) to the home NAT64 node (Block 309). The prefix binding request includes the prefix previously returned, an identifier for the mobile node and home agent, as well as the care-of address. The home NAT64 node binds the prefix to the mobile node home address, care-of address, associated port and related data in a prefix binding entry for the home address of the mobile node (Block 311). With this binding, the home NAT64 node will be able to properly translate addresses destined for the home address or received from the mobile node.

Figure 3B:
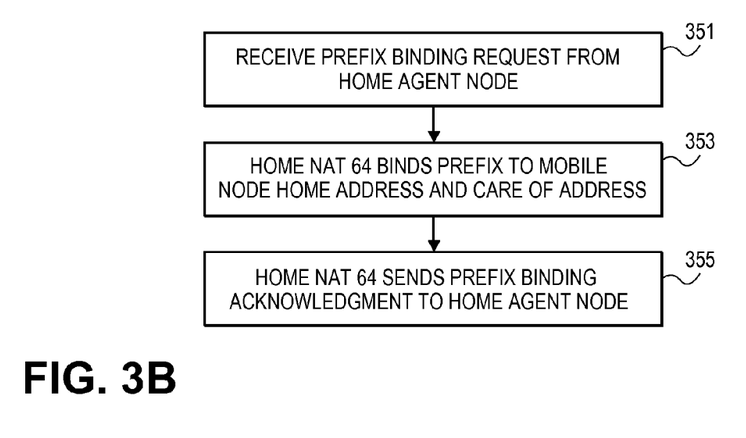
FIG. 3B is a flowchart of one embodiment of a process for configuring the home network to handle the processing of traffic for the mobile node in a foreign network implemented in the home NAT64 node.

FIG. 3A is a flowchart of one embodiment of a process for configuring a network to support the continuous connectivity of a mobile node with a corresponding node on an IPv4 network implemented at the home NAT64 node. This process is initiated at the home NAT64 node upon receipt of the prefix binding request from the home agent node (Block 351). The home NAT64 node stores the prefix in the translation table along with the home address, care-of address, session data and similar data related to the communication between the mobile node and corresponding node that enables the translation of data traffic from IPv4 format to IPv6 format and from IPv6 format to IPv4 format (Block 353). The home NAT64 node then sends a prefix binding acknowledgement (PBA) to the home agent node (Block 355). The prefix binding acknowledgement notifies the home agent node that the prefix binding request has been serviced by NAT64 and that the NAT64 is ready to handle traffic for the mobile node.

Figure 4:
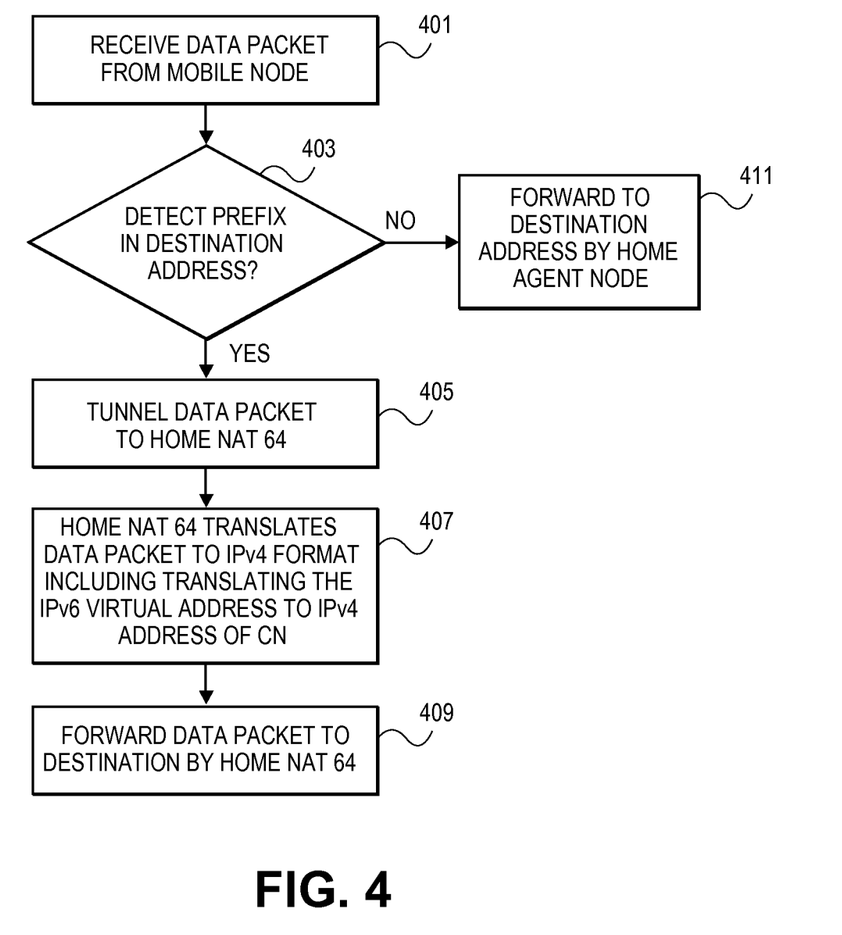
FIG. 4 is a diagram of one embodiment of a process for forwarding data from the mobile node to a corresponding node.

FIG. 4 is a diagram of one embodiment of a process for managing data traffic at the home network that is received for the mobile node. This process is initiated in response to receiving data packets from the mobile node at the home agent node (Block 401). The home agent node examines the received data packets to determine whether there are prefixes present in the destination address (Block 403). If no prefix is detected then the data traffic is forwarded to the destination address by the home agent node (Block 411). However, if a prefix is detected then the data traffic is tunneled to the NAT64 node (Block 405). The prefix is stored on local bindings that include the prefix and the care-of address for a mobile node.

The home NAT64 node receives the data traffic and translates the IPv6 virtual addresses and the destination addresses of the data traffic to the IPv4 address of the corresponding node (Block 407). The home NAT64 node has previously been provided the prefix information for the mobile node and can use the prefix information to accurately translate the IPv6 virtual address to the IPv4 address for the corresponding node. Once the IPv4 address has been inserted into the data traffic and the data traffic has been reformatted into the IPv4 format, then the data traffic can be forwarded to the destination node by the home NAT64 node (Block 409).

Figure 5:
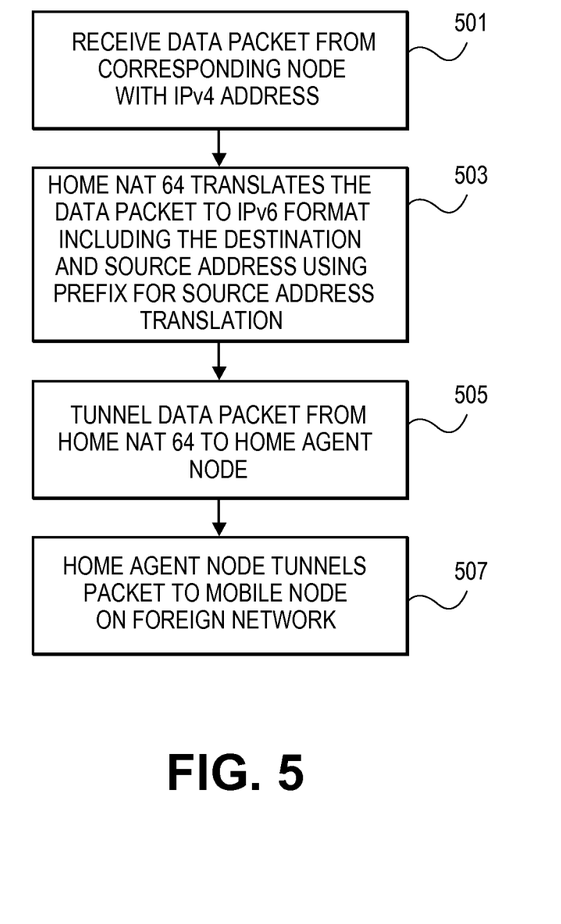
FIG. 5 is a flowchart of one embodiment of a process for forwarding data traffic from the corresponding node to the mobile node.

FIG. 5 is a flowchart of one embodiment of the process for handling data traffic received from the corresponding node. The process is initiated in response to receiving data packets from a corresponding node with an IPv4 address at the home NAT64 node (Block 501). The data is addressed to the home address of the mobile node using an IPv4 address of the home network. This data is received at the home NAT64 node of the home network, which translates the destination and source addresses using bound prefixes in a corresponding PBE for the source address (Block 503). The translated data packets are then tunneled from home NAT64 node to the home agent node (Block 505). The home agent node tunnels the packet to the mobile node on the foreign network (Block 507).

Thus, a method, system and apparatus for enabling IPv6 mobility with NAT64 has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for maintaining connectivity between a mobile node and a corresponding node when the mobile node connects to a foreign network, wherein a home address was associated with the mobile node and a home agent node when the mobile node was within a home network, wherein the foreign network and the home network are Internet protocol version 6 (IPv6) networks but the corresponding node is an Internet protocol version 4 (IPv4) node, the method comprising:

receiving at the home agent node connected to the home network a binding update message from the mobile node currently connected to the foreign network, the binding update message including an IPv6 care-of address of the mobile node assigned by the foreign network;

determining by the home agent node that the IPv6 care-of address belongs to the foreign network, that the foreign network has a foreign network address translation 64 (NAT64) node, and that the foreign NAT64 node has a prefix to append to IPv4 addresses to generate virtual IPv6 addresses for any IPv4 nodes communicating with the mobile node while in the foreign network, wherein a NAT64 translates data traffic between IPv4 and IPv6; and sending a prefix binding request message by the home agent node to a home NAT64 node on the home network to bind the prefix to the home address of the mobile node for translation between IPv6 and IPv4, whereby the home agent provides to the home NAT64 node binding information, including the foreign NAT64 node's prefix, that enables the home NAT64 node to translate between IPv6 and IPv4 formatted data packets, which are sent between the mobile node and the corresponding node, through concatenation of the prefix to the corresponding node's IPv4 address found in a source address field of those of the data packets traveling toward the mobile node, and through removal of the prefix from the corresponding node's virtual IPv6 address found in a destination address field of those of the data packets traveling toward the corresponding node.

2. The method of claim 1, further comprising the steps of:
receiving a data packet over a tunnel from the mobile node at the home agent;
decapsulating the data packet and detecting the foreign NAT64 node's prefix in the destination address field of the data packet; and
tunneling the data packet to the home NAT64 node on the home network.

3. The method of claim 1, wherein the step of determining by the home agent node that the IPv6 care-of address belongs to the foreign network further comprises the step of:

performing a lookup by the home agent through one of a domain name server of the care-of address provided by the mobile node to obtain the foreign NAT64 node's prefix.

4. The method of claim 1, further comprising the step of:
tunneling from the network element to the mobile node those of the data packets sent by the corresponding node to the mobile node, wherein these data packets have been translated by the home NAT64 node from IPv4 to IPv6 format and therefore have the corresponding node's virtual IPv6 address in their source address field.

5. A network element for maintaining connectivity between a mobile node and corresponding nodes when the mobile node is currently connected to a foreign network, wherein the network element is a part of a home network in which a home address was associated with the mobile node when the mobile node was within the home network, wherein the network element functions as a home agent for the mobile node and manages data traffic for the home address when the mobile node is in foreign networks, wherein the foreign networks and the home network are Internet protocol version 6 (IPv6) networks, but the corresponding nodes are Internet protocol version 4 (IPv4) nodes, the network element comprising:

a mobility management module configured to receive data traffic from the mobile node and forward that data traffic to a home network address translation 64 (NAT64) node, wherein the mobility management module is further configured to forward data traffic from the home NAT64 node to the mobile node, wherein a NAT64 translates data traffic between IPv4 and IPv6; and a bindings management module coupled to the mobility management module, the bindings management module configured to receive binding update messages from the mobile node when the mobile node connects to foreign networks, each of the binding update messages including an IPv6 care-of address provided by the mobile node, wherein the bindings management module is further configured to send a binding request message, responsive to each of the binding update messages, to the home NAT64 node to bind the mobile node's home address with a prefix of a foreign NAT64 node in that foreign network; and a prefix management module coupled to the bindings management module, wherein the prefix management module is configured to determine the foreign network which assigned the IPv6 care-of addresses to the mobile node, as well as the prefix used by that foreign network's foreign NAT64 node to generate virtual IPv6 addresses from IPv4 addresses of any IPv4 nodes in communication with that foreign network, whereby the network element provides with each of the binding request messages the binding information, including the foreign NAT64 node's prefix, to the home NAT64 node that enables the home NAT64 node to translate between IPv4 and IPv6 formatted data packets, which are sent between the mobile node and the corresponding nodes, through concatenation of that foreign NAT64 node's prefix to the corresponding nodes' IPv4 addresses found in a source address field of those of the data packets traveling toward the mobile node, and through removal of that foreign NAT64 node's prefix from the corresponding nodes' virtual IPv6 addresses found in a destination address field of those of the data packets traveling toward the corresponding nodes.

6. The network element of claim 5, wherein the mobility management module is configured to store bindings between the prefixes and the care-of addresses in a local cache.

7. The network element of claim 5, wherein the network mobility management module is configured to forward the data traffic through a tunnel to the mobile node.

8. A method for maintaining connectivity between a mobile node and a corresponding node when the mobile node is currently connected to a foreign network, wherein a home address was associated with the mobile node and a home agent node when the mobile node was within a home network, wherein the foreign network and the home network are Internet protocol version 6 (IPv6) networks but the corresponding node is an Internet protocol version 4 (IPv4) node, the method comprising:

receiving a prefix binding request message from the home agent node, wherein the prefix binding request message includes the home address of the mobile node and a prefix utilized by a foreign network address translation 64 (NAT64) node within the foreign network to append to IPv4 addresses to generate virtual IPv6 addresses for any IPv4 nodes communicating with the mobile node while on the foreign network, wherein a NAT64 translates data traffic between IPv4 and IPv6;

storing the foreign NAT64 node's prefix and the mobile node's home address in an entry of a translation table that is maintained by the network element to perform NAT64 translation within the home network, thereby binding the foreign NAT's prefix and the home address of the mobile node;

sending a prefix binding acknowledgement message to the home agent node to confirm that the translation table has been updated to bind the foreign NAT's prefix to the home address of the mobile node; and translating a first data packet received from the home agent node, which was sent by the mobile node to the corresponding node, from IPv6 to IPv4 format through detection and removal of the foreign NAT's prefix from the first data packet's destination address field, wherein the first packet's destination address field contained a virtual IPv6 address and the foreign NAT's prefix's removal there from leaves the IPv4 address of the corresponding node; and translating a second data packet, which was received from the corresponding node and was sent by the corresponding node to the mobile node, from IPv4 to IPv6 format through appending the foreign NAT's prefix to the second data packet's source address responsive to the second data packet's destination address field containing the mobile node's home address, wherein the second packet's source address field contained the corresponding node's IPv4 address and the foreign NAT's prefix's concatenation thereto yields the corresponding node's virtual IPv6 address, whereby the mobile node can maintain connectivity with the corresponding node transparent to the corresponding node and the foreign NAT64.

9. The method of claim 8, further comprising the step of:
tunneling the second data packet to the home agent node after translation, wherein the second data packet is to be forwarded to the mobile node by the home agent node.

10. A network element for maintaining connectivity between a mobile node and corresponding nodes when the mobile node is currently connected to a foreign network, wherein the network element is a part of a home network in which a home address was associated with the mobile node when the mobile node was within the home network, wherein the network element performs network address translation for the home network, wherein a network address translation 64 (NAT64) translates data traffic between IPv4 and IPv6, wherein the foreign networks and the home network are Internet protocol version 6 (IPv6) networks, but the corresponding nodes are Internet protocol version 4 (IPv4) nodes, the network element comprising:

a bindings management module configured to process binding request messages received from a home agent node and reply with binding acknowledgement messages sent to the home agent node, wherein each of the binding request messages includes both the mobile node's home address and a prefix used by a foreign NAT64 node in the foreign network to which to the mobile node is currently connected, wherein the bindings management module is further configured to maintain a translation table that has an entry that stores a binding of the mobile node's home address and the foreign NAT64 node's prefix of the most recent of the binding request messages; and a translation module coupled to the bindings management module, the translation module configured to translate outbound data packets sent by the mobile node to corresponding nodes from IPv6 to IPv4 format, the translation including detection and removal of the foreign NAT64 node's prefix from outbound data packets' destination address field, wherein the outbound data packets' destination address field contain virtual IPv6 addresses and the foreign NAT64 node's prefix's removal there from leaves the IPv4 address of the corresponding nodes, and wherein the translation module is further configured to use a current binding in the translation table to translate inbound data packets received from the corresponding nodes from IPv4 to IPv6 format through appending the foreign NAT64 node's prefix to the inbound data packets' source address responsive to detecting that the inbound data packets' destination address is the mobile node's home address, wherein the inbound data packets' source address field contains the corresponding nodes' IPv4 addresses and the foreign NAT64 nodes' prefix's concatenation thereto yields the corresponding nodes' virtual IPv6 addresses, whereby the mobile node can maintain connectivity with corresponding nodes transparent to the corresponding nodes and the foreign NAT64 node.

11. The network element of claim 10, wherein the network element further comprises:
a data tunneling module coupled to the translation module, the data tunneling module configured to tunnel inbound data packets to the home agent node after processing by the translation module, wherein the home agent node forwards the inbound data packets to the mobile node.

* * * * *

UNITED STATES PATENT AND TRADEMARK OFFICE
CERTIFICATE OF CORRECTION

PATENT NO. : 8,509,185 B2
APPLICATION NO. : 12/819074
DATED : August 13, 2013
INVENTOR(S) : Haddad Page 1 of 1

It is certified that error appears in the above-identified patent and that said Letters Patent is hereby corrected as shown below:

On the Title page, in Column 1, item (51), under "Int. Cl.",
insert -- H04W 4/00 (2009.0) H04J 3/16 (2006.0) --.

On the Title page, item (57), under "ABSTRACT", in Column 2, Line 9,
delete "prefix to to" and insert -- prefix to --, therefor.

On Title page 2, item (56), under "OTHER PUBLICATIONS", in Column 1,
Line 4, delete "draft-bagnulo-behave-nat64-03.bd," and
insert -- draft-bagnulo-behave-nat64-03.txt, --, therefor.

In the Specification

In Column 5, Line 2, delete "node" and insert -- node. --, therefor.

In Column 5, Line 57, delete "and a" and insert -- and/or a --, therefor.

In Column 7, Line 3, delete "foreign network 117." and insert -- foreign network 115. --, therefor.

In Column 7, Line 19, delete "DNS64 107." and insert -- DNS64 103. --, therefor.

In Column 7, Lines 33-34, delete "home network 107," and insert -- home network 117, --, therefor.

Signed and Sealed this
Eighteenth Day of February, 2014

Michelle K. Lee
*Deputy Director of the United States Patent and Trademark Office*